United States Patent
Sekine et al.

(10) Patent No.: US 8,722,260 B2
(45) Date of Patent: May 13, 2014

(54) INTEGRATED APPARATUS OF GAS-LIQUID SEPARATOR AND DILUTER

(75) Inventors: Hiroyuki Sekine, Miyoshi (JP); Mitsuo Kubota, Toyota (JP); Yoshinori Miyazaki, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 351 days.

(21) Appl. No.: 13/147,161

(22) PCT Filed: Dec. 11, 2009

(86) PCT No.: PCT/JP2009/007721
§ 371 (c)(1),
(2), (4) Date: Jul. 29, 2011

(87) PCT Pub. No.: WO2010/089630
PCT Pub. Date: Aug. 12, 2010

(65) Prior Publication Data
US 2012/0021308 A1 Jan. 26, 2012

(30) Foreign Application Priority Data
Feb. 3, 2009 (JP) ................... 2009-022850

(51) Int. Cl.
*H01M 8/06* (2006.01)
*H01M 8/04* (2006.01)

(52) U.S. Cl.
USPC .......................................... 429/414; 429/413

(58) Field of Classification Search
None
See application file for complete search history.

(56) References Cited

U.S. PATENT DOCUMENTS

| | | | |
|---|---|---|---|
| 2006/0040158 A1 | 2/2006 | Numata et al. | |
| 2006/0086074 A1 | 4/2006 | Kasuya et al. | |
| 2006/0088756 A1 | 4/2006 | Sato et al. | |
| 2006/0204817 A1 | 9/2006 | Yamaguchi | |
| 2006/0240299 A1* | 10/2006 | Kanasugi | 429/24 |
| 2007/0015031 A1 | 1/2007 | Numata et al. | |
| 2007/0243438 A1 | 10/2007 | Katano | |
| 2009/0252997 A1* | 10/2009 | Katano et al. | 429/13 |

FOREIGN PATENT DOCUMENTS

| | | |
|---|---|---|
| CN | 1977413 A | 6/2007 |
| DE | 11 2005 000 871 T5 | 6/2007 |
| DE | 10 2007 032 807 A1 | 1/2009 |
| JP | 2002-373699 A | 12/2002 |
| JP | 2003-132915 A | 5/2003 |
| JP | 2004-6183 A | 1/2004 |
| JP | 2005-310717 A | 11/2005 |
| JP | 2006-120438 A | 5/2006 |
| JP | 2006-252955 A | 9/2006 |
| JP | 2007-080728 A | 3/2007 |
| JP | 2008-140783 A | 6/2008 |
| JP | 2009-272090 A | 11/2009 |
| WO | 2005/104282 A1 | 11/2005 |

OTHER PUBLICATIONS

International Search Report issued May 25, 2010 in PCT/IB2009/007721 & Written Opinion.

* cited by examiner

*Primary Examiner* — John S Maples
(74) *Attorney, Agent, or Firm* — Kenyon & Kenyon LLP

(57) ABSTRACT

An integrated apparatus includes: a gas-liquid separator that separates a gas and a liquid from a gas-liquid mixture fluid; a diluter disposed below the gas-liquid separator; and a communication pipe that communicates between the gas-liquid separator and the diluter, and that is disposed at a predetermined angle to a horizontal direction, and that introduces at least the liquid separated from the gas-liquid mixture fluid, into the diluter. The gas-liquid separator, the diluter, and the communication pipe are integrated.

13 Claims, 8 Drawing Sheets

INTEGRATED APPARATUS OF GAS-LIQUID SEPARATOR AND DILUTER

This is a 371 national phase application of PCT/IB2009/007721 filed 11 Dec. 2009, claiming priority to Japanese Patent Application No. 2009-022850 filed 3 Feb. 2009, the contents of which are incorporated herein by reference.

BACKGROUND OF THE INVENTION

1. Field of the Invention

The invention relates to an integrated apparatus in which a gas-liquid separator and a diluter are integrally constructed. In particular, the invention relates to an integrated apparatus of a gas-liquid separator and a diluter in which a gas-liquid separator and a diluter arranged for use in a fuel cell system are integrated.

2. Description of the Related Art

In a fuel cell system in the related art, a gas-liquid separator is disposed for the purpose of separating water (moisture) from exhaust gas that is discharged from the fuel cell. One of various gas-liquid separators of this kind is a cyclone-type separator.

Japanese Patent Application Publication No. 2002-373699 (JP-A-2002-373699) discloses a cyclone type gas-liquid separator that includes: a cylindrical main body portion whose upper and lower ends are tightly closed; an inlet pipe provided in the vicinity of and in a tangent direction of a cylindrical upper portion of the main body portion; an outlet pipe provided in a central portion of a top plate portion of the main body portion so as to be protruded inward and outward therefrom; a water storage tank portion provided in a lower portion of the main body portion; and a drain pipe provided on the water storage tank portion, wherein many ribs that give resistance to movement of water extend upward from a bottom portion of the water storage tank.

Besides, in the fuel cell system in the related art, a hydrogen diluter is disposed for the purpose of diluting an anode off-gas (hydrogen gas) discharged from the fuel cell with a cathode off-gas (e.g., air) so as to sufficiently reduce the hydrogen concentration before releasing the anode off-gas into the atmosphere.

An example of such a hydrogen diluter is a hydrogen diluter disclosed in Japanese Patent Application Publication. No. 2003-132915 (JP-A-2003-132915) which includes: a holding region in which the anode off-gas discharged from a fuel cell resides; a dilution region in which the cathode off-gas (air) discharged from the fuel cell is conducted, and the cathode off-gas is diluted by mixing it with the anode off-gas from the holding region; and a conduction portion that conducts the anode off-gas from the holding region to the dilution region.

Japanese Patent Application Publication No. 2007-80728 (JP-A-2007-80728) discloses a hydrogen diluter that includes: an introduction chamber in which the anode off-gas is accumulated; a communication passageway that communicates between the introduction chamber and a cathode off-gas channel; a communication valve that changes the state of communication of the communication passageway, and that is closed when a purge valve is opened, and becomes able to be opened when the purge valve is closed; and pressing means for shrinking the capacity of the introduction chamber by pressing the introduction chamber from outside when the communication valve is opened.

Besides, Japanese Patent Application Publication No. 2008-140783 (JP-A-2008-140783) discloses a hydrogen diluter that includes: a holding chamber in which the anode off-gas resides; an anode lead-in passageway that leads the anode off-gas to the holding chamber; a cathode lead-in passageway that leads the cathode off-gas to the residence chamber; and an off-gas lead-out passageway that leads out the anode off-gas and the cathode off-gas, wherein an opening of the cathode lead-in passageway and an opening of the off-gas lead-out passageway face each other, and are disposed near to each other with a gap left between the openings.

However, the gas-liquid separator disclosed in Japanese Patent Application Publication No. 2002-373699 (JP-A-2002-373699) and the like normally has a structure in which a water pipe is provided in a horizontal direction for a water storage tank portion. Therefore, there is possibility of water residing in the water pipe when a diluter is disposed at a downstream side of the gas-liquid separator. Besides, since the gas-liquid separator in accordance with the related art has such a structure as to store water in the water storage tank portion by utilizing the gravity, there is also a possibility of failure in the gas-liquid separation and overflow of water. Besides, none of Japanese Patent Application Publication No. 2003-132915 (JP-A-2003-132915), Japanese Patent Application Publication No. 2007-80728 (JP-A-2007-80728), Japanese Patent Application Publication No. 2008-140783 (JP-A-2008-140783), etc. gives any description or the like of consideration of the relation between the gas-liquid separator and the hydrogen diluter.

SUMMARY OF THE INVENTION

The invention provides an integrated apparatus of a gas-liquid separator and a diluter which is able to efficiently perform gas-liquid separation and efficiently dilute a gas introduced into the diluter, and which allows size reduction.

A first aspect of the invention relates to an integrated apparatus that includes: a gas-liquid separator that separates a gas and a liquid from a gas-liquid mixture fluid in which the gas and the liquid are mixed; a diluter disposed below the gas-liquid separator; and a communication pipe that communicates between the gas-liquid separator and the diluter, and that is disposed at a predetermined angle to a horizontal direction, and that introduces the liquid separated from the gas-liquid mixture fluid, into the diluter. In this integrated apparatus, the gas-liquid separator, the diluter, and the communication pipe are integrally constructed.

According to the foregoing construction, the gas-liquid separator, and the diluter disposed below the gas-liquid separator are connected by the communication pipe that is disposed at a predetermined angle to the horizontal direction. Therefore, when the liquid separated by the gas-liquid separator is introduced into the diluter through the communication pipe, the liquid can be caused to fall into the diluter by utilizing the gravity. Therefore, residence of liquid in the communication pipe can be restrained. Besides since the gas-liquid separator and the diluter are integrally constructed, size reduction can be achieved.

In the integrated apparatus in accordance with the foregoing aspect of the invention, the gas-liquid separator may have an upper component member that constitutes an upper portion of the gas-liquid separator, and the diluter may have a lower component member that constitutes a lower portion of the diluter. Furthermore, a shared member may be positioned between the upper component member and the lower component member, and may be provided integrally with the upper component member and the lower component member. The shared member may constitute a lower portion of the gas-liquid separator, and an upper portion of the diluter, and the communication pipe may be formed in the shared member. According to the foregoing construction, since the shared member constitutes a lower portion of the gas-liquid separator, and an upper portion of the diluter, the number of component parts can be reduced, and the size of the apparatus can be further reduced.

In the integrated apparatus in accordance with the foregoing aspect of the invention, the integrated apparatus may be connected to a fuel cell stack, and the gas-liquid mixture fluid may be a fluid in which an anode off-gas discharged from the fuel cell stack, and water are mixed. Furthermore, the diluter may have an extension chamber into which a portion of a cathode off-gas discharged from the fuel cell stack, the water, and a portion of the anode off-gas are introduced, and in which the introduced portion of the cathode off-gas and the introduced portion of the anode off-gas are mixed, and from which a mixed gas of the cathode off-gas and the anode off-gas, and the water are discharged, and a cathode off-gas channel that guides and discharges the cathode off-gas excluding the portion introduced into the extension chamber. The extension chamber may have flow passage control members that are disposed so as to control flow of the portion of the anode off-gas, at a position at an upstream side and a position at a downstream side in a flow passage direction of the cathode off-gas introduced in the extension chamber.

With this construction, a portion of the cathode off-gas can be introduced, due to the pressure loss occurring in the cathode off-gas channel, into the extension chamber that contains the anode off-gas, and the anode off-gas and the cathode off-gas can be efficiently mixed, and the anode off-gas diluted with the cathode off-gas can be discharged. Besides, since the diluter provided integrally with the gas-liquid separator is positioned below the gas-liquid separator, the water introduced into the gas-liquid separator is warmed by the high-temperature cathode off-gas that is introduced into the diluter, so that the freezing can be restrained. Furthermore, since the water collects in the bottom surface of the diluter is also warmed by the high-temperature cathode off-gas, the freezing of the water can also be restrained. Besides, if water freezes, the thawing thereof can be accelerated by the high-temperature cathode off-gas. Still further, the extension chamber can be ventilated by the cathode off-gas before the next hydrogen purge. Incidentally, the amount and the timing of introduction of the anode off-gas into the extension chamber, and the like can be set or adjusted, for example, by connecting a flow adjustment valve or the like.

Besides, in the integrated apparatus in accordance with the foregoing aspect of the invention, a portion of the anode off-gas discharged from the fuel cell stack may be introduced into the extension chamber through the communication pipe. Besides, at least one of the flow passage control members may have a labyrinth structure. According to the foregoing constructions, the anode off-gas can be more certainly retained within the extension chamber, and can be diluted therein and be discharged therefrom.

In the integrated apparatus in accordance with the foregoing aspect, the labyrinth structure may be made up of a plurality of wall portions that are extended downward from a lower surface of the shared member. At least a portion of lower ends of the wall portions may closely contact an upper surface of the lower component member. According to the foregoing constructions, the strength of the integrated apparatus of the gas-liquid separator and the diluter can be further improved.

In the integrated apparatus in accordance with the foregoing aspect, at least one of the flow passage control members may be made up of a wall portion that extends downward from a lower surface of the shared member, and that has at least one slit. According to the foregoing construction, the anode off-gas and the cathode off-gas can easily be mixed by jetting.

Furthermore, in the integrated apparatus in accordance with the foregoing aspect, the extension chamber may have a whirl chamber that whirls the mixed gas introduced via the flow passage control member disposed at the downstream side, between the flow passage control member disposed at the downstream side, and a side wall that defines the downstream side of the extension chamber. According to the foregoing construction, the mixture of the anode off-gas and the cathode off-gas can be accelerated, so that the performance of diluting the anode off-gas can be further improved.

Besides, in the integrated apparatus in accordance with the foregoing aspect, the gas-liquid separator may have a guide portion that is provided in the shared member, and that guides flow of the gas-liquid mixture fluid, and at least a portion of an upper end of the guide portion may be in close contact with a bottom surface of the upper component member, and at least a portion of a lower end of the guide portion may be in close contact with an upper surface of the lower component member. According to the foregoing construction, the gas-liquid mixture fluid can be efficiently separated into gas and liquid. Besides, due to the guide portion, the strength of the integrated apparatus of the gas-liquid separator and the diluter can be further improved.

Besides, in the integrated apparatus in accordance with the foregoing aspect, the guide portion may have a guide wall portion that is disposed substantially parallel to a direction of introduction of the gas-liquid mixture fluid, and in the gas-liquid separator, an anode gas discharge opening through which the separated anode gas is discharged may be formed at a side of the guide wall portion which is opposite a side of introduction of the gas-liquid mixture fluid. According to the foregoing construction, the gas-liquid mixture fluid can be guided from a narrow space into a broad space, so that the anode off-gas, which is relatively light in weight, and water, which is relatively heavy, can be more efficiently separated.

Besides, in the integrated apparatus in accordance with the foregoing aspect, the gas-liquid mixture fluid may whirl around the guide portion. According to the foregoing construction, the anode off-gas and water can be even more efficiently separated.

Besides in the integrated apparatus in accordance with the foregoing aspect, a penetration hole through which water is allowed to flow may be formed in a lower end of the guide portion. According to the foregoing construction, the water obtained by the gas-liquid separation can be guided into the communication pipe via (through) the penetration hole. Therefore, drainage can be further improved.

In the integrated apparatus in accordance with the foregoing aspect, the mixed gas may be discharged from the extension chamber, at a downstream side in a direction of flow passage of a portion of a cathode off-gas that is introduced.

In the integrated apparatus in accordance with the foregoing aspect, the communication pipe may be disposed perpendicularly to or obliquely to the horizontal direction.

According to the invention, it is possible to provide an integrated apparatus of a gas-liquid separator and a diluter which is able to efficiently perform the gas-liquid separation, and to efficiently dilute the gas introduced into the diluter, and to achieve size reduction.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
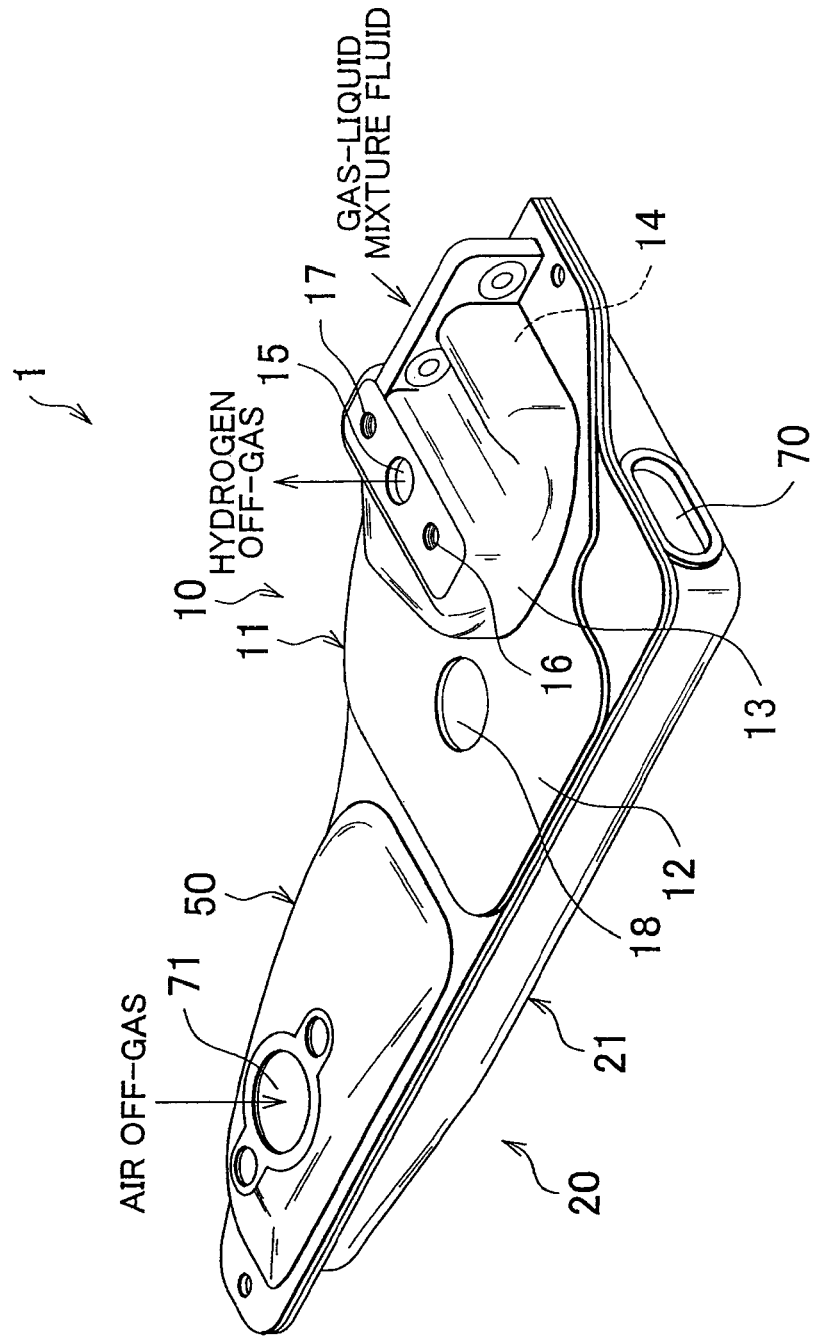
FIG. 1 is a perspective view of an integrated apparatus of a gas-liquid separator and a diluter in accordance with an embodiment of the invention.

An integrated apparatus of a gas-liquid separator and a diluter in accordance with an embodiment of the invention will be described with reference to the drawings.

The thicknesses and sizes of various members, and the enlargement and reduction ratios thereof, etc., in the drawings are not equivalent to actual values, but are appropriately determined so as to make the description easier to understand.

Incidentally, in this embodiment, an integrated apparatus in which a gas-liquid separator and a diluter arranged in a fuel cell system are integrated will be described. Besides, for the purpose of making the description easier to understand, in a construction in which the integrated apparatus is connected to a fuel cell stack, a surface of the integrated apparatus that faces the fuel cell stack is termed "the back surface" or "the rear", a surface of the integrated apparatus that is opposite the back surface is termed "the front surface" or "the front", and a right-hand side of the integrated apparatus when one faces the front surface is termed "the right", and a left-hand side thereof is termed "the left".

As shown in FIGS. 1 to 6, and FIG. 8, an integrated apparatus 1 in accordance with an embodiment in which a gas-liquid separator 10 and a diluter 20 are integrally constructed includes an upper component member 11 that constitutes an upper portion of the gas-liquid separator 10, a lower component member 21 that constitutes a lower portion of the diluter 20, and a shared member 50 that is positioned between the upper component member 11 and the lower component member 21, and that is provided integrally with the upper component member 11 and the lower component member 21. That is, the gas-liquid separator 10 is constructed by the upper component member 11, and an upper surface of the shared member 50 which faces the upper component member 11. The diluter 20 is constructed by a lower surface of the shared member 50, and the lower component member 21.

The upper component member 11 has a substantially horizontal plate portion 12, and a dome portion 13 that is formed continuously from the plate portion 12, and that is protruded upward from the plate portion 12, generally in the shape of a dome.

A right-side back surface of the dome portion 13 is provided with a gas-liquid mixture fluid lead-in opening 14 that is connected to a hydrogen discharge opening 101 of a fuel cell stack 100 (see FIG. 7), and that leads a gas-liquid mixture fluid containing a hydrogen off-gas (anode off-gas) and water from a hydrogen discharge opening 101 into the gas-liquid separator 10. Besides, an upper surface of a portion of the dome portion 13 slightly to the left side of a center of the dome portion 13 is provided with a hydrogen off-gas discharge opening 15 through which a hydrogen off-gas separated within the gas-liquid separator 10 is discharged. The hydrogen off-gas discharge opening 15 is connected to the hydrogen lead-in opening 102 (see FIG. 7) of the fuel cell stack 100 (the connected state is not shown). The hydrogen off-gas discharged from the hydrogen off-gas discharge opening 15 is returned from the hydrogen lead-in opening 102 to the fuel cell stack 100, and is used again as an anode gas. Besides, two side portions of an upper surface of the dome portion 13 that are opposite each other in the front-rear direction across the hydrogen off-gas discharge opening 15 are provided with screw holes 16 and 17 that are superimposed on screw holes 55 and 56 that are formed in an upper surface of a guide portion 51 that is provided on the shared member 50 that will be described in detail later. Besides, a hole 18 at which a valve for flow amount adjustment, or the like is disposed is formed to the left of the plate portion 12.

Figure 5:
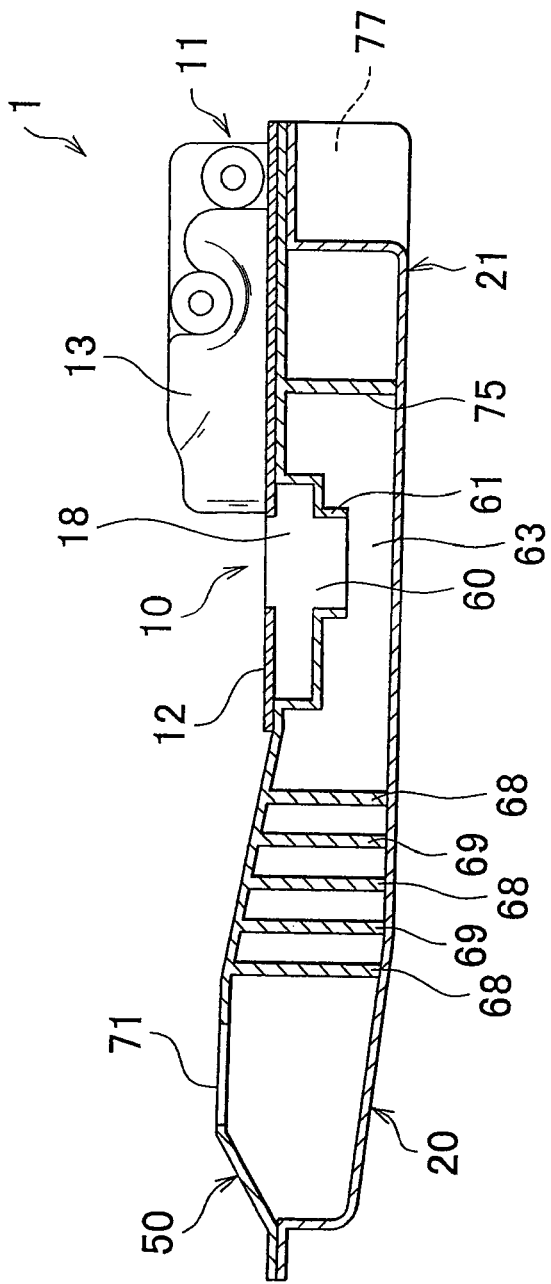
FIG. 5 is a sectional view taken along line V-V shown in FIG. 3.

A substantially right-side half of the upper surface of the shared member 50 is a gas-liquid separator component region that constitutes a lower portion of the gas-liquid separator 10. A recess portion 60 that is withdrawn downward is formed in a portion of the upper surface of the shared member 50 that is to the left of the guide portion 51. A substantially central portion of the recess portion 60 is provided with an opening portion of a communication pipe 61 that communicates between the gas-liquid separator 10 and the diluter 20, and that introduces water separated from the gas-liquid mixture fluid by the gas-liquid separator 10 into the diluter 20. This communication pipe 61 extends downward from a bottom surface of the recess portion 60 as shown in FIG. 5. Specifically, since the communication pipe 61 is able to allow the water separated from the gas-liquid mixture fluid to flow substantially in the vertical direction (allows it to fall), the communication pipe 61 is able to utilize the gravity in discharging the water. Therefore, the dwelling of liquid in the communication pipe 61 can be restrained.

A right-side portion of the upper surface of the shared member 50 is provided with the guide portion 51 that guides the flow of the gas-liquid mixture fluid so that the gas-liquid mixture fluid introduced from the gas-liquid mixture fluid lead-in opening 14 whirls within the gas-liquid separator 10. This guide portion 51 has a guide wall portion 52 that is disposed substantially parallel to the lead-in direction of the gas-liquid mixture fluid that is introduced through the gas-liquid mixture fluid lead-in opening 14, and cylindrical portions 53 and 54 that are formed continuously from two side portions of the guide wall portion 52 that are opposite each other in the front-rear direction.

Figure 3:
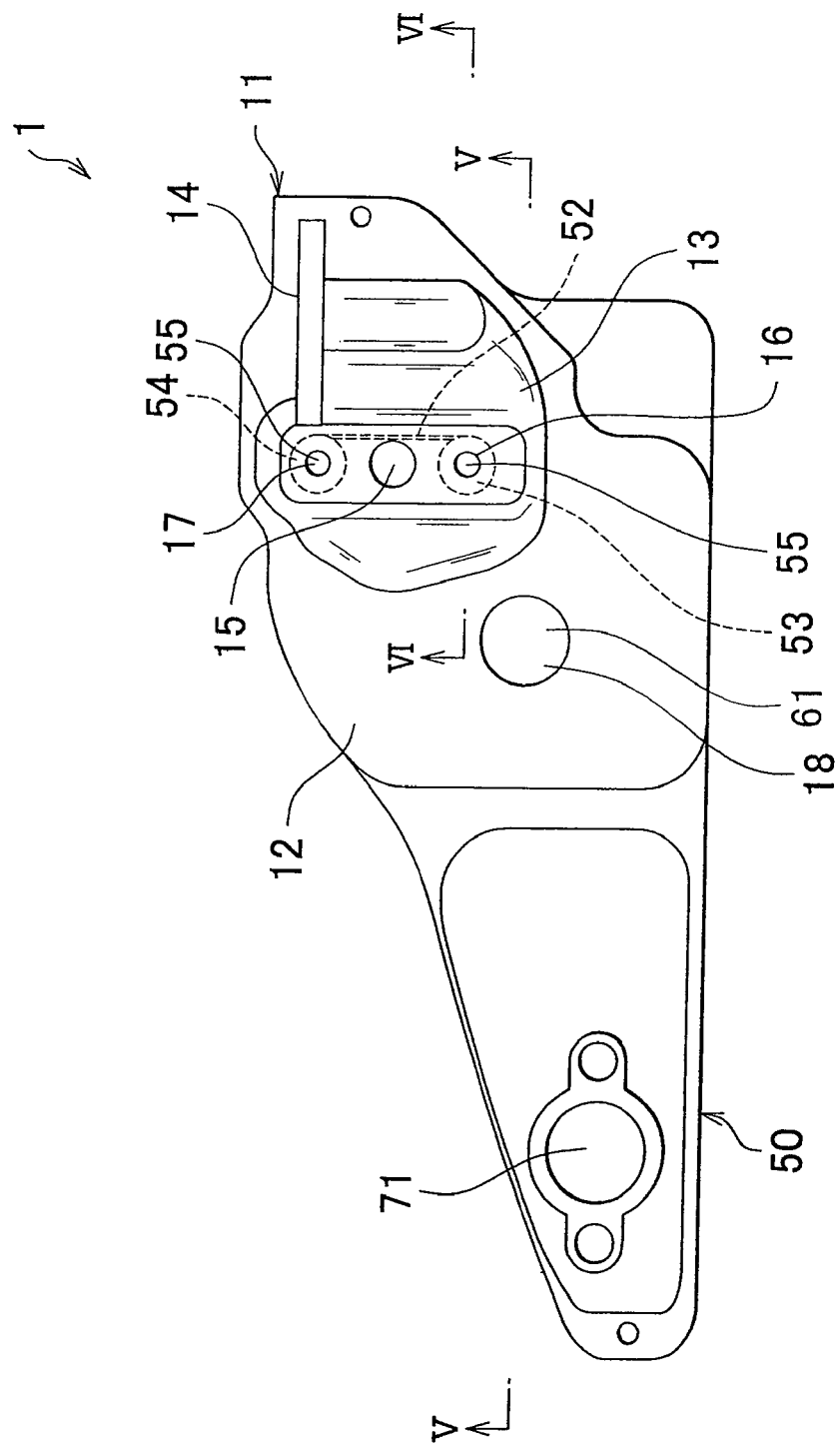
FIG. 3 is a plan view of the integrated apparatus shown in FIG. 1.
Figure 6:
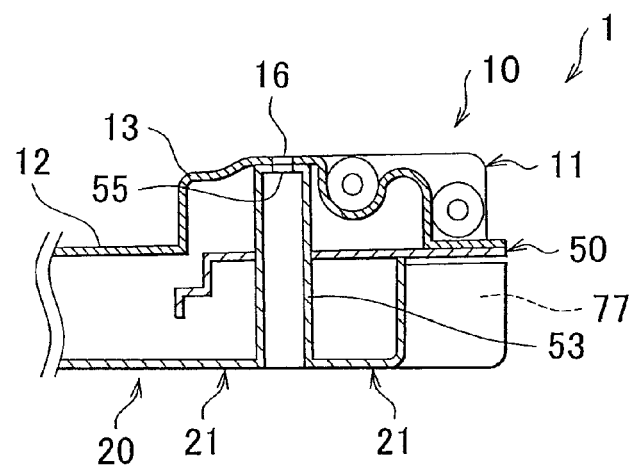
FIG. 6 is a sectional view taken along line VI-VI shown in FIG. 3.

The screw holes 55 and 56 are formed in the upper surfaces of the cylindrical portions 53 and 54, respectively. The screw holes 55 and 56 are disposed at such positions as to be superimposed on the screw holes 16 and 17 that are formed in the upper component member 11, when the upper component member 11 is placed on the shared member 50. Then, screws (not shown) for fixing the upper component member 11 and the shared member 50 to each other are screwed into the screw holes 16 and 55, and into the screw holes 17 and 56. Upper ends of the cylindrical portions 53 and 54 are welded to the lower surface of the upper component member 11, as shown in FIG. 6. Lower ends of the cylindrical portions 53 and 54 extend through the shared member 50 and downward therefrom, and are welded to an upper surface of the lower component member 21. The guide wall portion 52, as shown in FIG. 3, is positioned to the right side of the hydrogen off-gas discharge opening 15 when the upper component member 11 is placed on the shared member 50. Thus, the hydrogen off-gas discharge opening 15 is positioned at a side of the guide wall portion 52 which is opposite the gas-liquid mixture fluid lead-in opening 14. The upper end of the guide wall portion 52 is welded to the lower surface of the upper component member 11. Thus, since the upper ends of the cylindrical portions 53 and 54, and the upper end of the guide wall portion 52 are welded to the lower surface of the upper component member 11, and the lower ends of the cylindrical portions 53 and 54 are welded to the upper surface of the lower component member 21, the cylindrical portions 53 and 54 and the guide wall portion 52 play the role of reinforcement members, and will improve the strength of the integrated apparatus 1.

Incidentally, the gas-liquid separator 10 is constructed, as shown in FIG. 3, so that a gap formed by surfaces of the guide portion 51 that face in the left-right directions, and by an internal wall surface of the dome portion 13 is broader than a gap formed by surfaces of the guide portion 51 that face in the front-rear directions, and by the internal wall surface of the dome portion 13. Therefore, the gas-liquid mixture fluid introduced through the gas-liquid mixture fluid lead-in opening 14 passes through a narrow gap that is formed by the front side surface of the guide portion 51 and the internal wall surface of the dome portion 13, and then flows in a broad space that is formed by the left side surface of the guide portion 51 and the internal wall surface of the dome portion 13. Therefore, hydrogen, which is relatively light in weight, and water, which is relatively heavy, can be efficiently separated from each other. Besides, the gas-liquid mixture fluid containing water that has not been separated but still remains therein further moves through a narrow gap that is formed by the rear side surface of the guide portion 51 and the internal wall surface of the dome portion 13, and thus whirls around the guide portion 51. In this manner, the water that has not been separated from the gas-liquid mixture fluid can be separated therefrom, and the swirling-up of water can be restrained. Then, the water thus separated is led from the recess portion 60 through the communication pipe 61 into the diluter 20. At this time, the gas-liquid mixture fluid containing the hydrogen off-gas that has not been separated therefrom is led together with the separated water, through the communication pipe 61 into the diluter 20. On the other hand, the hydrogen off-gas light in weight which has been separated from the gas-liquid mixture fluid moves upward, and is efficiently discharged from the hydrogen off-gas discharge opening 15, and is returned into the fuel cell stack 100.

Figure 7:
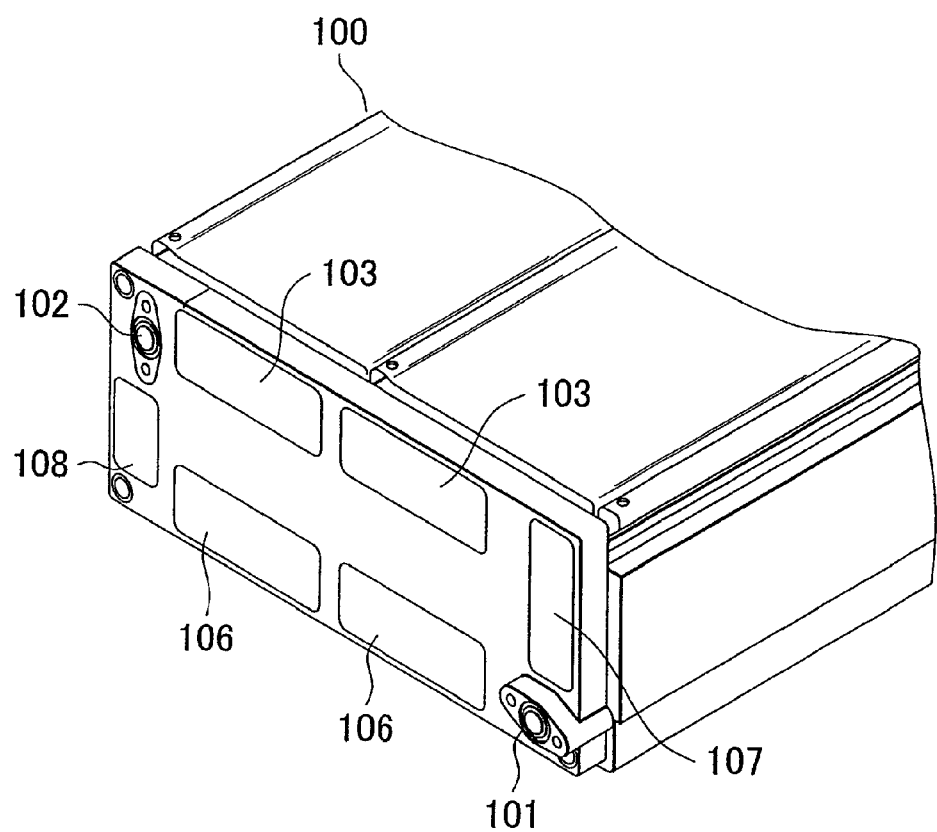
FIG. 7 is a perspective view of a portion of a fuel cell stack to which the integrated apparatus shown in FIG. 1 is connected.
Figure 8:
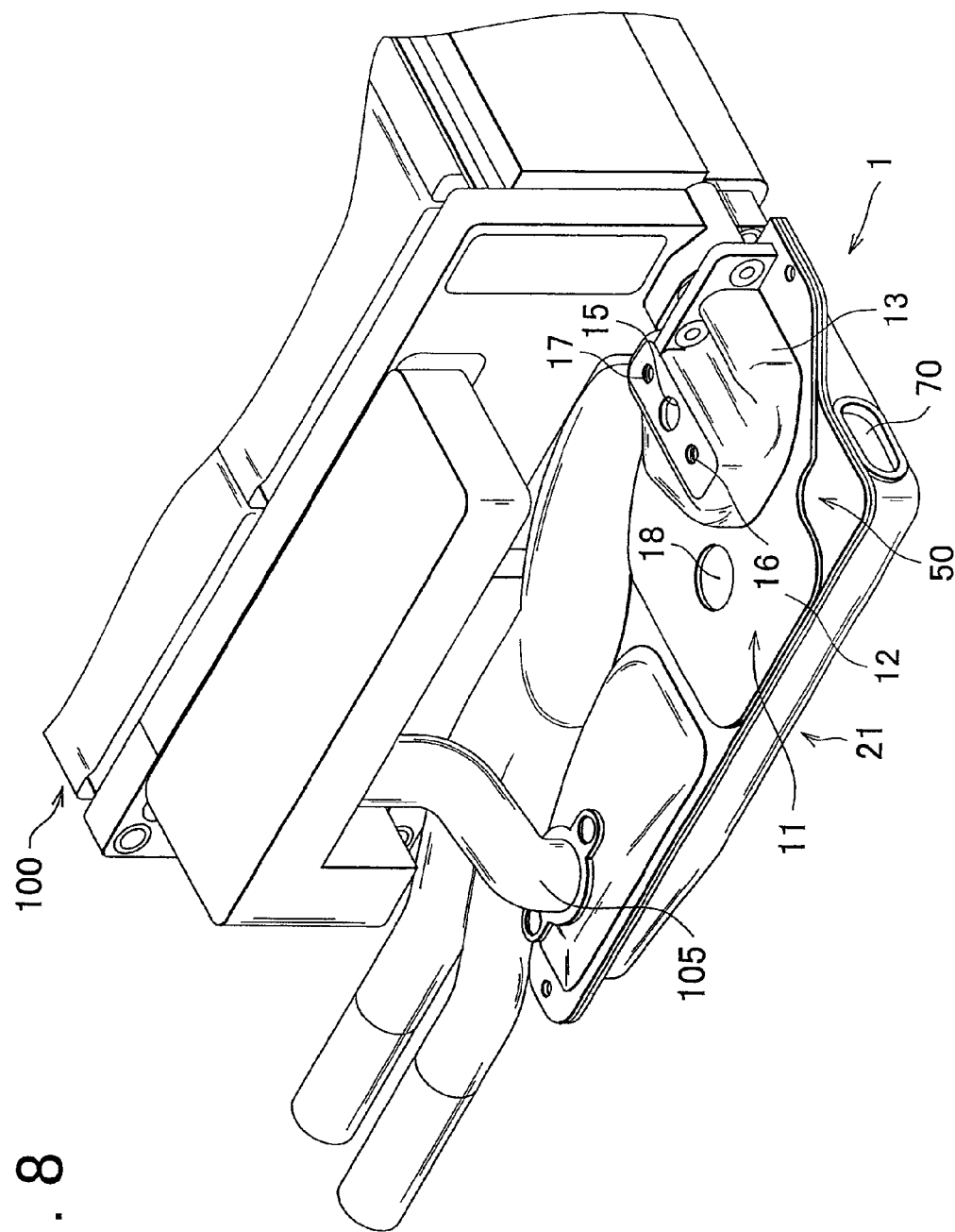
FIG. 8 is a perspective view showing a state in which a portion of the integrated apparatus shown in FIG. 1 is connected to the fuel cell stack shown in FIG. 7.

Besides, a left-side portion of the shared member 50 is provided with an air off-gas lead-in opening 71 that is connected to air off-gas discharge openings 103 (see FIG. 7) of the fuel cell stack 100, and that leads the air off-gas discharged from the air off-gas discharge openings 103, into the diluter 20. Incidentally, the air off-gas lead-in opening 71 is connected to the air off-gas discharge opening 103 via a piping 105, as shown in FIG. 8. In FIG. 7, reference character 106 denotes air lead-in openings, and 107 denotes a cooling water discharge opening, and 108 denotes a cooling water lead-in opening.

Figure 4:
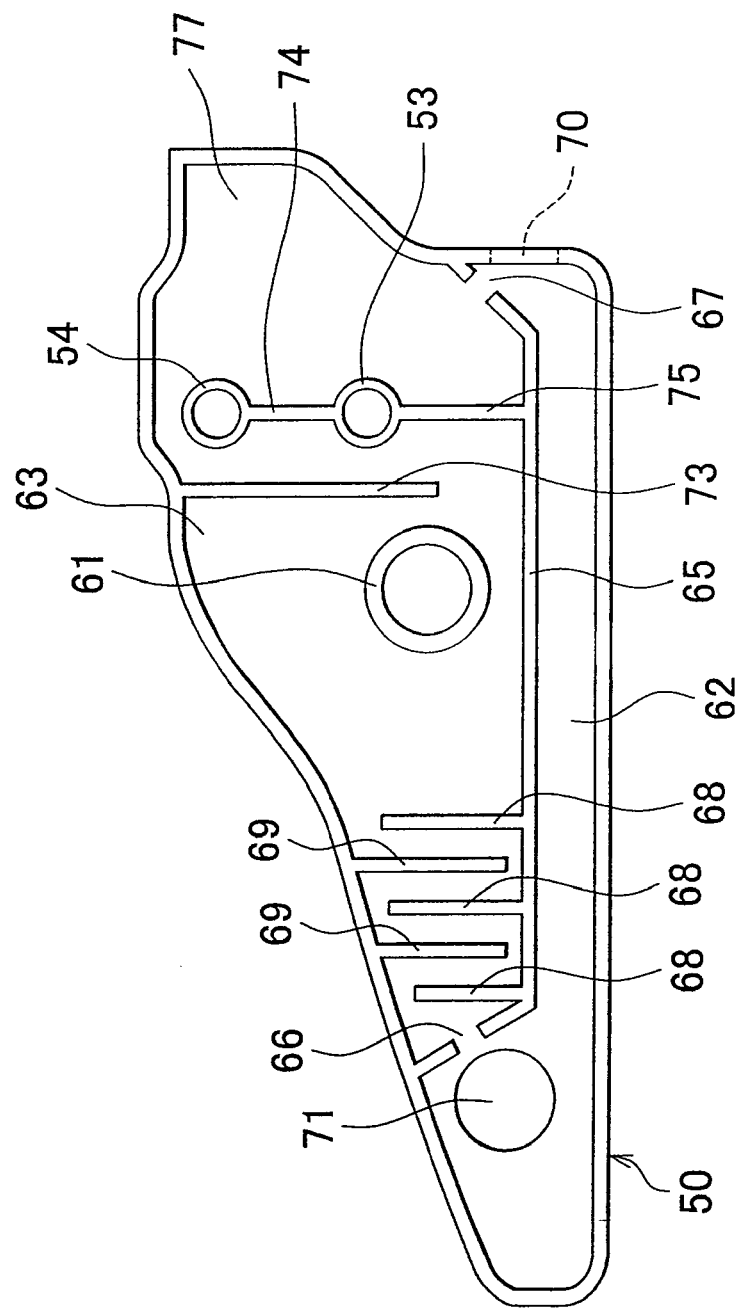
FIG. 4 is a plan view of a bottom surface of a shared member, in a see-through view from above.

The lower surface of the shared member 50 is a diluter component region that forms an upper portion of the diluter 20. The diluter 20 has an air off-gas channel 62 that causes the air off-gas introduced through the air off-gas lead-in opening 71 to flow toward a fluid discharge opening 70 that is formed in a right-side end of the lower component member 21 (described below), and an extension chamber 63 provided for diluting the hydrogen off-gas introduced through the communication pipe 61 together with water. A division wall 65 for dividing the air off-gas channel 62 and the extension chamber 63 as shown in FIG. 4 is extended downward from the lower surface of the shared member 50. A lower end of the division wall 65 is welded to the upper surface of the lower component member 21.

The air off-gas lead-in opening 71 is positioned in an upper left-side portion of the air off-gas channel 62. A dilution air lead-in opening 66 for introducing a portion of the air off-gas into the extension chamber 63 is formed in a portion of the division wall 65 that is near the air off-gas lead-in opening 71. Besides, a portion of the division wall 65 near the fluid discharge opening 70 is provided with a discharge opening 67 that discharges fluid from the extension chamber 63 to the air off-gas channel 62.

A dilution air lead-in opening 66-side portion of the extension chamber 63 has a labyrinth structure that serves as a flow passage control member that restrains (controls) the outflow of the hydrogen off-gas introduced into the extension chamber 63, out into the air off-gas channel 62 through the dilution air lead-in opening 66. This labyrinth structure is constructed of a plurality of wall portions 68 and 69 (five wall portions in this embodiment) that are extended downward from the lower surface of the shared member 50 with predetermined intervals left therebetween. Specifically, this labyrinth structure is constructed by an alternate arrangement in which the wall portions 68 one end of each of which is formed continuously from the division wall 65, and another end of each of which is spaced from a rear side end portion of the shared member 50, and the wall portions 69 one end of each of which is formed continuously from the rear side end portion of the shared member 50, and another end of each of which is spaced from the division wall 65 are alternately arranged. Lower ends of these wall portions 68 and 69 are welded to the upper surface of the lower component member 21.

A wall portion 73 one end of which is formed continuously from a rear side end portion of the shared member 50, and another end of which is spaced from the division wall 65 is extended downward from the lower surface of the shared member 50, at a position between a position at which the communication pipe 61 is disposed, and a position at which the cylindrical portions 53 and 54 are disposed. Besides, a wall portion 74 connecting the cylindrical portions 53 and 54 in the front-rear direction is extended downward from the lower surface of the shared member 50. A wall portion 75 connecting the cylindrical portion 53 and the division wall 65 in the front-rear direction is extended downward from the lower surface of the shared member 50. The wall portion 74 is formed continuously from the cylindrical portions 53 and 54, and the wall portion 75 is formed continuously from the cylindrical portion 53 and the division wall 65. Besides, lower ends of these wall portions 73, 74 and 75 are welded to the upper surface of the lower component member 21.

Incidentally, since the wall portions 68, 69, and 73 to 75 are welded to the upper surface of lower component member 21, these wall portions play the role of reinforcement members, and will improve the strength of the integrated apparatus 1. Besides, as shown in FIG. 4, a portion made up of the cylindrical portion 54, the wall portion 74, the cylindrical portion 53 and the wall portion 75, and the wall portion 73 form a labyrinth structure. This labyrinth structure plays the role of a flow passage control member that controls the flow of fluid so that the hydrogen off-gas diluted by air off-gas within the extension chamber 63 is gradually discharged from the discharge opening 67.

A right-side rear portion of the extension chamber 63 is protruded rightward. This protrusion forms a space that makes up a whirl chamber 77 in which the fluid having passed through between the cylindrical portion 54 and the wall portion 73 of the extension chamber 63 and moving toward the discharge opening 67 can whirl around. The hydrogen off-gas and the air off-gas, after reaching the whirl chamber 77, form eddy, so that the hydrogen off-gas is more efficiently diluted by the air off-gas.

Figure 2:
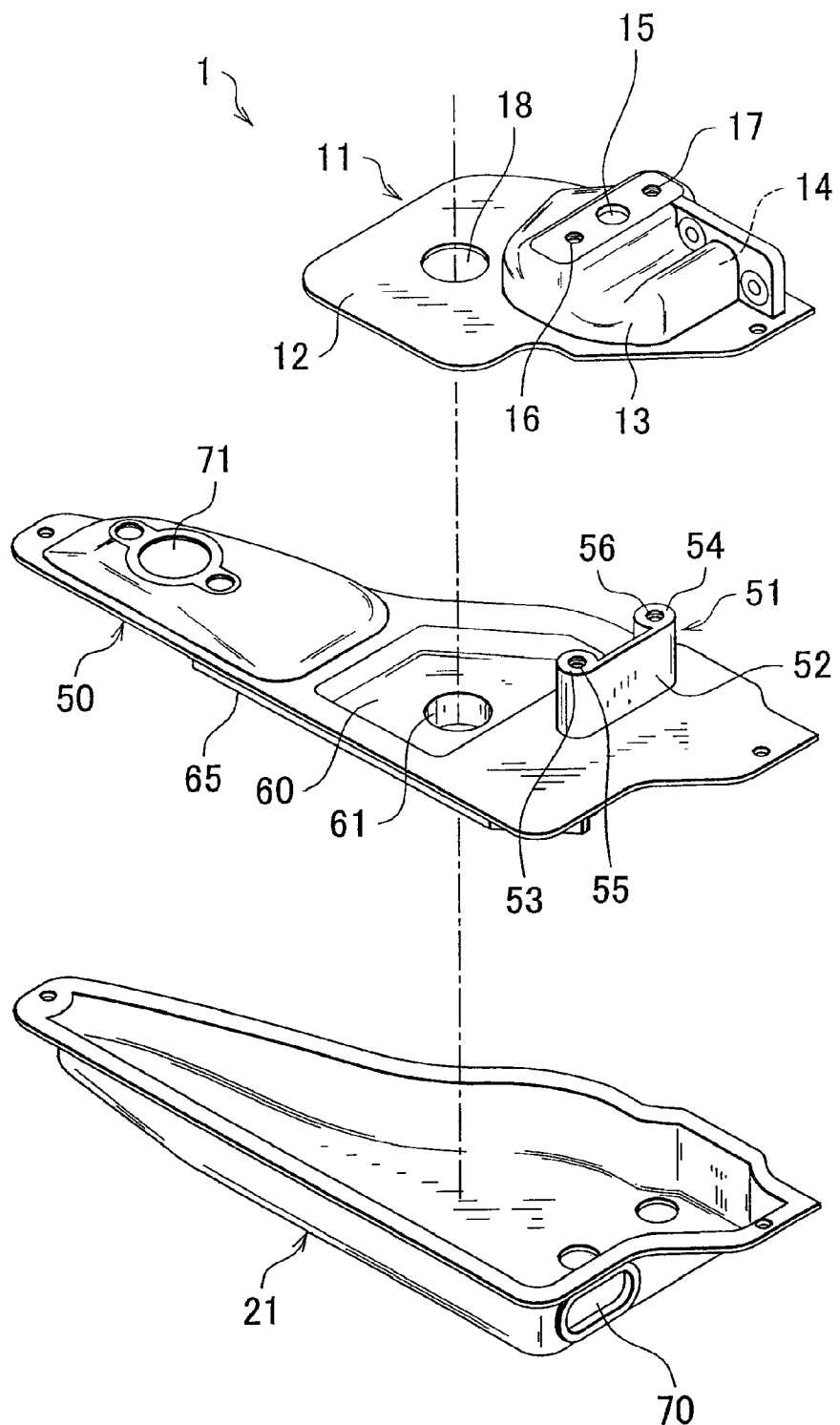
FIG. 2 is an exploded perspective view of the integrated apparatus shown in FIG. 1.

A right-hand side wall of the lower component member 21 is provided with the fluid discharge opening 70, through which the fluid having passed through the inside of the diluter 20 (air off-gas, hydrogen off-gas diluted by air off-gas, water, etc.) is discharged. This lower component member 21 is constructed so as to have a large bottom area as shown in FIG. 2. Therefore, the water guided from the communication pipe 61 into the diluter 20 is held in a bottom portion of the lower component member 21, in large area at small depth.

The upper component member 11, the shared member 50 and the lower component member 21 constructed as described above are integrally fixed, for example, by fastener members, such as screws, bolts and nuts, etc., so as to form the integrated apparatus 1 in which the gas-liquid separator 10 and the diluter 20 are integrally constructed. Because the gas-liquid separator 10 and the diluter 20 are integrally constructed as described above, a size reduction can be achieved.

Next, concrete actions of the integrated apparatus 1 in accordance with this embodiment will be described.

When the anode gas (fuel gas: hydrogen), and the cathode gas (oxidizing gas: oxygen) are supplied to the fuel cell stack 100, and electrochemical reactions start, a gas-liquid mixture fluid of hydrogen off-gas and water is discharged from the hydrogen discharge opening 101 of the fuel cell stack 100. Then, this gas-liquid mixture fluid is introduced into the gas-liquid separator 10 through the gas-liquid mixture fluid lead-in opening 14. The gas-liquid mixture fluid led into the gas-liquid separator 10 passes through a narrow gap that is formed by the front side surface of the guide portion 51 and the internal wall surface of the dome portion 13, and flows into a large space that is formed by the left-hand side surface of the guide portion 51 and the internal wall of the dome portion 13. Due to the cyclone effect, hydrogen, relatively light in weight, and water, relatively heavy, are efficiently separated from each other. The hydrogen obtained through gas-liquid separation moves upward, and is efficiently discharged through the hydrogen off-gas discharge opening 15, and is returned into the fuel cell stack 100. On the other hand, the water obtained through the gas-liquid separation, and the hydrogen off-gas that has not been gas-liquid separated are introduced into the diluter 20 via the communication pipe 61. The water is stored in the bottom surface of the lower component member 21. At this time, the communication pipe 61 is open in the vertical directions, and water falls by the gravity, so that the dwell of water in the communication pipe 61 can be restrained.

On the other hand, the air off-gas discharged from the air off-gas discharge openings 103 of the fuel cell stack 100 is introduced to the upstream side of the air off-gas channel 62 of the diluter 20 through the air off-gas lead-in opening 71. Due to the pressure loss that occurs in the air off-gas channel 62, a portion of the air off-gas is led from the dilution air lead-in opening 66 into the extension chamber 63 through the labyrinth structure that is formed by the wall portions 68 and 69. The air off-gas introduced into the extension chamber 63 is mixed with the hydrogen off-gas introduced into the diluter 20 through the communication pipe 61, thus diluting the hydrogen off-gas. The mixed fluid (of air off-gas, and diluted hydrogen off-gas) reaches the whirl chamber 77 through the labyrinth structure that is constructed of the wall portion 73, and the portion made up of the cylindrical portion 54, the wall portion 74, the cylindrical portion 53, and the wall portion 75, and is discharged through the discharge opening 67 of the whirl chamber 77 to the downstream side of the air off-gas channel 62. Incidentally, due to the labyrinth structures disposed at the upstream side and the downstream side of the extension chamber 63, hydrogen off-gas can be efficiently held in the extension chamber 63, and can be efficiently mixed and diluted with air off-gas, and can be discharged, while good space saving is achieved.

Besides, the air off-gas that is not introduced into the extension chamber 63 flows through the air off-gas channel 62 toward the fluid discharge opening 70 (the downstream side), and is discharged through the fluid discharge opening 70 together with the fluid that is discharged into the air off-gas channel 62 through the discharge opening 67.

It is to be noted herein that since the gas-liquid separator 10 is disposed above the air off-gas channel 62 through which warm air off-gas that has passed through the fuel cell stack 100 flows, the gas-liquid separator 10 can be provided with an effect of thawing ice that is formed in the gas-liquid separator 10. Furthermore, since the water held in the diluter 20 is held in large area at small depth, it is easy to thaw ice if the water freezes. Thus, the thawing time can be reduced.

Besides, during the period between the discharge of air off-gas and diluted hydrogen off-gas from the discharge opening 67 and the next hydrogen purge, the inside of the extension chamber 63 may be ventilated with air off-gas as a preparation for the next hydrogen purge.

Besides, although the embodiment has been described in conjunction with the case where the lower ends of the wall portions 68, 69, and 73 to 75 are welded to the upper surface of the lower component member 21, this is not restrictive. For example, the lower ends of the wall portions 68, 69, and 73 to 75 may also be in close contact with the upper surface of the lower component member 21, instead of being welded to the upper surface thereof. Besides, a discharge-purpose penetration hole through which water can flow may be formed between a portion of the lower ends of the wall portions 68, 69, and 73 to 75, and the upper surface of the lower component member 21. This construction makes it possible to efficiently move water to the fluid discharge opening 70 through the discharge-purpose penetration hole, and thus improves the drain characteristic.

Figure 9:
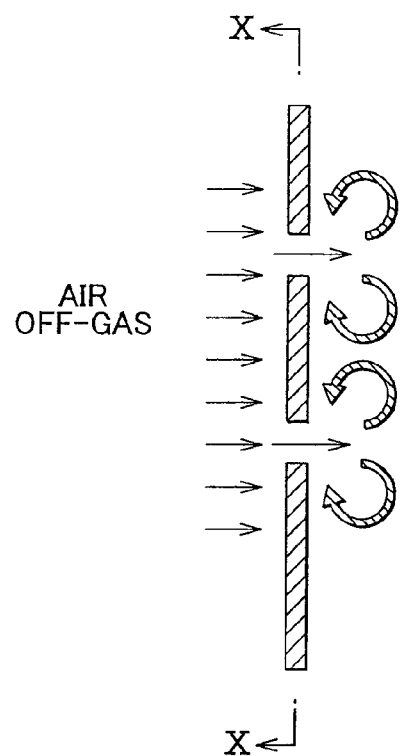
FIG. 9 is a sectional view of a flow passage control member in accordance with an embodiment of the invention, which is taken along line IX-IX shown in FIG. 10.
Figure 10:
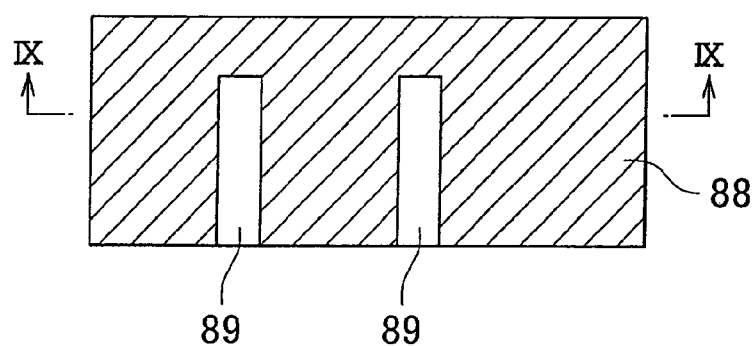
FIG. 10 is a sectional view taken along line X-X shown in FIG. 9.

Besides, although the foregoing embodiment has been described in conjunction with the case where the labyrinth structures are provided as flow passage control members, this is not restrictive. For example, as shown in FIGS. 9 and 10, it is also possible to adopt a construction in which a wall portion 88 one end of which is formed continuously from the rear-side end portion of the shared member 50, and another end of which is formed continuously from the division wall 65, and which extends in the front-rear direction is formed at the upstream side and/or the downstream side of the extension chamber 63. At least one slit 89 is formed in the wall portion 88 so that air off-gas that passes through the slit 89 to the downstream side forms jet flows, thus facilitating the mixture with the hydrogen off-gas. The wall portion 88 may be extended from the lower surface of the shared member 50, and the lower end of the wall portion 88 may be welded to the upper surface of the lower component member 21. Incidentally, FIG. 9 is a sectional view taken along line IX-IX in FIG. 10, and FIG. 10 is a sectional view taken along line X-X shown in FIG. 9.

The foregoing embodiment has been described in conjunction with the case where the division wall 65, and the wall portions 68, 69, and 73 to 75 are extended from the lower surface of the shared member 50, this is not restrictive. For example, the wall portions 65, 68, 69, and 73 to 75 may also be provided in different arrangements, for example, an arrangement in which the wall portions are extended upward from the upper surface of the lower component member 21, etc. Besides, the number of wall portions provided to form the labyrinth structure is not limited to a predetermined number, or the like.

Besides, although the embodiment has been described in conjunction with the case where the communication pipe 61 is provided in a substantially vertical direction, this is not restrictive. For example, the communication pipe 61 may also be inclined at a predetermined angle to the horizontal direction, as long as water can be introduced into the diluter 20 by utilizing the gravity.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

The invention claimed is:

1. An integrated apparatus comprising:
   a gas-liquid separator that separates a gas and a liquid from a gas-liquid mixture fluid in which the gas and the liquid are mixed;
   a diluter disposed below the gas-liquid separator; and
   a communication pipe that communicates between the gas-liquid separator and the diluter, and that is disposed at a predetermined angle to a horizontal direction, and that introduces the liquid separated from the gas-liquid mixture fluid, into the diluter, wherein
   the gas-liquid separator, the diluter, and the communication pipe are integrally constructed;
   the gas-liquid separator has an upper component member that constitutes an upper portion of the gas-liquid separator;
   the diluter has a lower component member that constitutes a lower portion of the diluter;
   a shared member is positioned between the upper component member and the lower component member,
   the integrated apparatus is connected to a fuel cell stack;
   the gas-liquid mixture fluid is a fluid in which an anode off-gas discharged from the fuel cell stack, and water are mixed;
   the diluter has an extension chamber into which a portion of a cathode off-gas discharged from the fuel cell stack, the water, and a portion of the anode off-gas are introduced, and in which the introduced portion of the cathode off-gas and the introduced portion of the anode off-gas are mixed, and from which a mixed gas of the cathode off-gas and the anode off-gas, and the water are discharged, and a cathode off-gas channel that guides and discharges the cathode off-gas excluding the portion introduced into the extension chamber; and
   the extension chamber has flow passage control members that are disposed so as to control flow of the portion of the anode off-gas, at a position at an upstream side and a position at a downstream side in a flow passage direction of the cathode off-gas introduced in the extension chamber,
   wherein at least one of the flow passage control members is made up of a wall portion that extends downward from a lower surface of the shared member, and that has at least one slit.

2. The integrated apparatus according to claim 1, wherein:
   the shared member is provided integrally with the upper component member and the lower component member;
   the shared member constitutes a lower portion of the gas-liquid separator, and an upper portion of the diluter; and
   the communication pipe is formed in the shared member.

3. The integrated apparatus according to claim 1, wherein a portion of the anode off-gas discharged from the fuel cell stack is introduced into the extension chamber through the communication pipe.

4. The integrated apparatus according to claim 1, wherein at least one of the flow passage control members have a labyrinth structure.

5. The integrated apparatus according to claim 4, wherein the labyrinth structures is made up of a plurality of wall portions that are extended downward from a lower surface of the shared member.

6. The integrated apparatus according to claim 5, wherein at least a portion of lower ends of the wall portions closely contact an upper surface of the lower component member.

7. The integrated apparatus according to claim 1, wherein the extension chamber has a whirl chamber that whirls the mixed gas introduced via the flow passage control member disposed at the downstream side, between the flow passage control member disposed at the downstream side, and a side wall that defines the downstream side of the extension chamber.

8. The integrated apparatus according to claim 1, wherein:
   the gas-liquid separator has a guide portion that is provided in the shared member, and that guides flow of the gas-liquid mixture fluid; and
   at least a portion of an upper end of the guide portion is in close contact with a bottom surface of the upper component member, and at least a portion of a lower end of the guide portion is in close contact with an upper surface of the lower component member.

9. The integrated apparatus according to claim 8, wherein:
   the guide portion has a guide wall portion that is disposed substantially parallel to a direction of introduction of the gas-liquid mixture fluid; and
   in the gas-liquid separator, an anode gas discharge opening through which the separated anode gas is discharged is formed at a side of the guide wall portion which is opposite a side of introduction of the gas-liquid mixture fluid.

10. The integrated apparatus according to claim 8, wherein the gas-liquid mixture fluid whirls around the guide portion.

11. The integrated apparatus according to claim 1, wherein a penetration hole through which water is allowed to flow is formed in a lower end of the guide portion.

12. The integrated apparatus according to claim 1, wherein the mixed gas is discharged from the extension chamber, at a downstream side in a direction of flow passage of a portion of a cathode off-gas that is introduced.

13. The integrated apparatus according to claim 1, wherein the communication pipe is disposed perpendicularly to or obliquely to the horizontal direction.

* * * * *